March 5, 1957 D. E. BRANSON ET AL 2,784,397

NUMBER DISPLAY DEVICE

Filed Jan. 15, 1954 3 Sheets-Sheet 1

INVENTORS D. E. BRANSON
W. T. REA
BY William F. Simpson,
ATTORNEY

March 5, 1957 D. E. BRANSON ET AL 2,784,397

NUMBER DISPLAY DEVICE

Filed Jan. 15, 1954 3 Sheets-Sheet 2

INVENTORS D. E. BRANSON
W. T. REA
BY William F. Simpson.

ATTORNEY

NUMBER DISPLAY DEVICE

Filed Jan. 15, 1954

3 Sheets-Sheet 3

INVENTORS D.E. BRANSON
W.T. REA

BY William F. Simpson.

ATTORNEY 2,784,397

NUMBER DISPLAY DEVICE

David E. Branson, Morristown, N. J., and Wilton T. Rea, Manhasset, N. Y., assignors to Bell Telephone Laboratories, Incorporated, New York, N. Y., a corporation of New York Application January 15, 1954, Serial No. 404,165

12 Claims. (Cl. 340—378)

This invention relates to a display device and more particularly to a display device for displaying symbols represented by coded signals.

In display devices of prior art, complicated apparatus or circuits or both have been required to translate the coded information and then select the proper display device for displaying the symbol represented by the various codes. Alternatively, complicated printing equipment is required to print the information represented by the code.

In accordance with this invention a simplified display device is provided which is both simple and light in weight so that it is suitable for use in an aeroplane. In addition, its operation is both fast and reliable. By simplifying the mechanism the maintenance problem has been greatly reduced. Moreover, it is not necessary to step any mechanism from one display to the next. The change may be made substantially instantaneously.

Briefly, in accordance with this invention a small motor is provided for continuously rotating a plurality of discs. One of the discs carries a code pattern and the other discs carry the symbols represented by the codes in question. In addition a flashing light, together with an optical system, is provided for each of the symbol discs, and a light source and optical system is provided for the code disc. The code disc is continuously illuminated but the discs carrying the symbols are illuminated only at brief instants under control of the circuits in accordance with this invention. An input register or other device is provided for designating the symbols to be displayed or for receiving the input code. A viewing aperture, field, or position is provided for each of the symbol discs. The symbol discs are oriented or positioned with respect to the code disc in such a manner that the respective symbols of the symbol discs are positioned in the viewing field, aperture, or position at the same time the code on the code disc representing the respective symbols is illuminated or in the scanning position. Each time the code obtained from the code disc corresponds with the incoming coded signals and the symbols are in the proper position in the viewing field, one of the lamps flashes and illuminates one or more of the disc carried symbols, and thus illuminates the desired symbol. Control circuits are provided so that the lamp is flashed a number of times during each revolution depending upon the number of symbols to be displayed substantially simultaneously or adjacent one another.

While the invention is suitable for use in displaying words or other information, the exemplary embodiment shown in the drawing and described herein is arranged to display numbers having three denominational orders in which any one of the numerals 0 through 9 may be displayed in any one of the denominational orders. The device is arranged to respond to three code groups of binary signals, one code group representing each denominational order of the number to be displayed.

A feature of this invention relates to the use of phototransistors as light sensitive elements and transistors for pulse amplifiers which are employed to flash the light illuminating the various symbols represented by the incoming coded information.

The foregoing and other objects and features of the invention may be more readily understood by reference to the following description of an exemplary embodiment of this invention when read with reference to the drawing in which.

Figure 1:
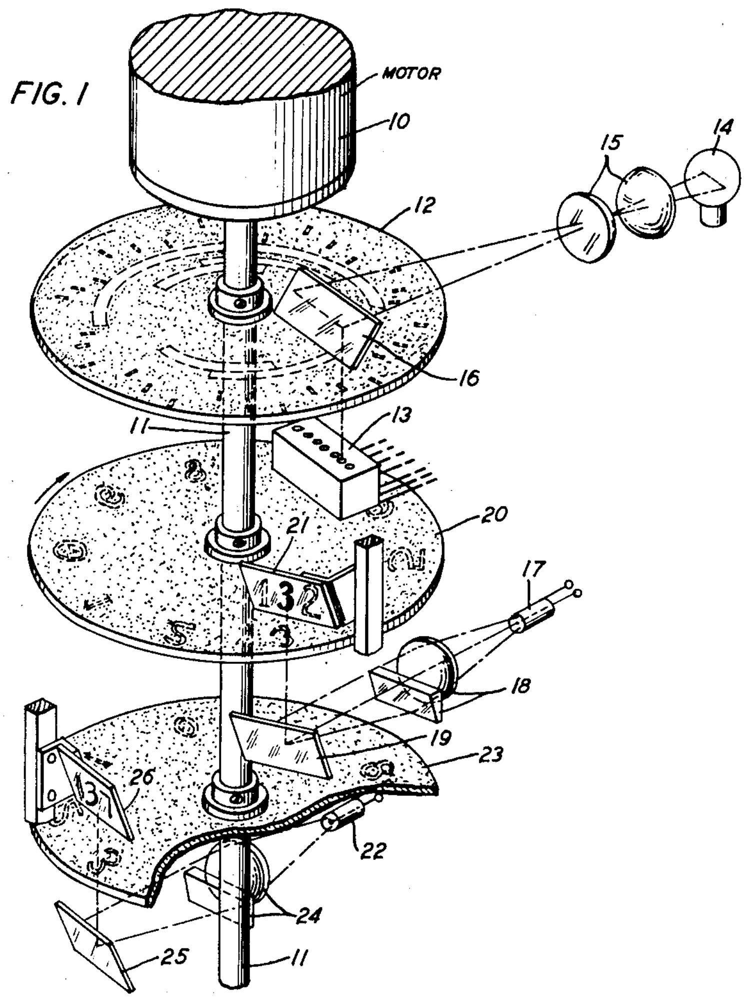
Fig. 1 shows a perspective view of the various elements of the rotating system of an exemplary embodiment of a high speed display device.
Figures 5, 7:
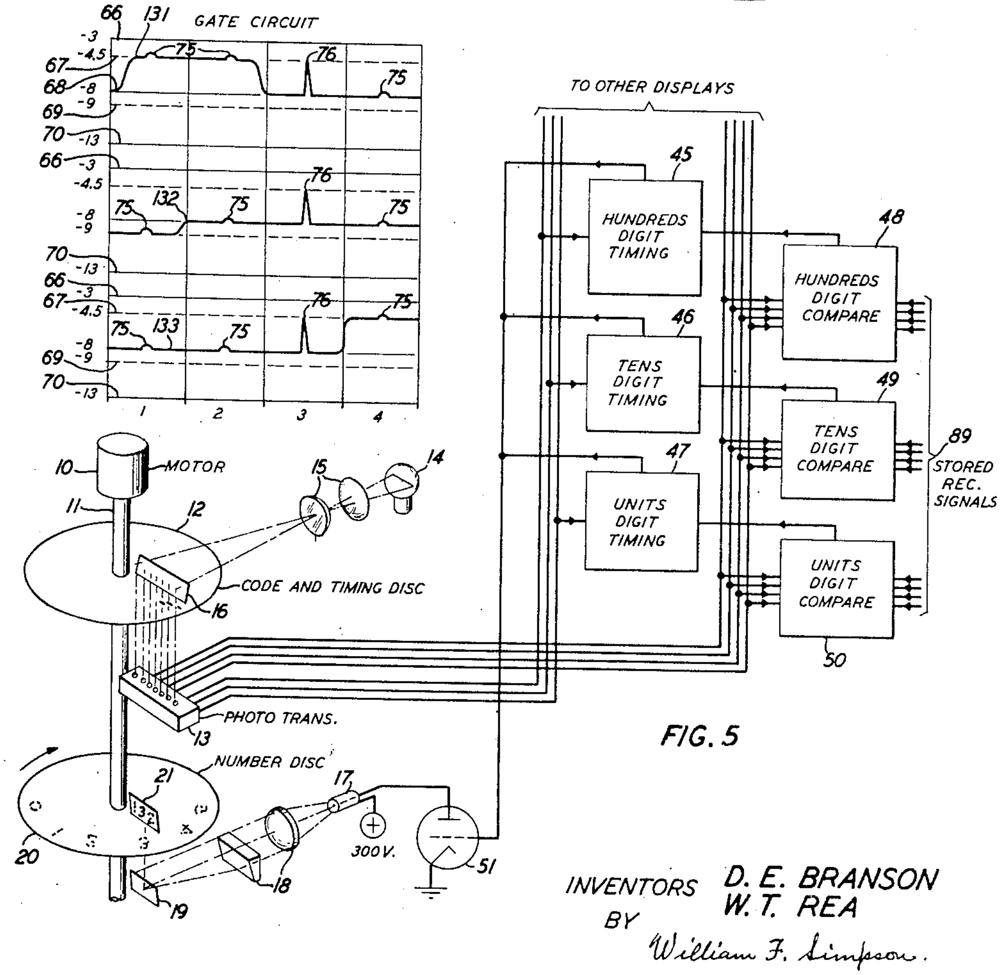
Fig. 5 shows the manner in which the rotating portion of the display device, the electro-optical portion and the electrical control circuit cooperate to provide multi-symbol displays under control of coded information.
Fig. 7 shows graphs of the voltage in three of the comparing circuits.

A continuously operating motor 10 is shown in Figs. 1 and 5, which motor continuously rotates shaft 11, which shaft is shown in Figs. 1, 2, 3, 4 and 5. The speed of rotation of the shaft 11 is not critical and need not be synchronized with any of the received signals. It is of course desirable to rotate the shaft at a speed of rotation such that the time of one revolution is shorter than the persistence of vision. Thus by repeatedly illuminating the various symbols once for each revolution the display does not appear to flicker but appears to be as steadily illuminated.

Figure 4:
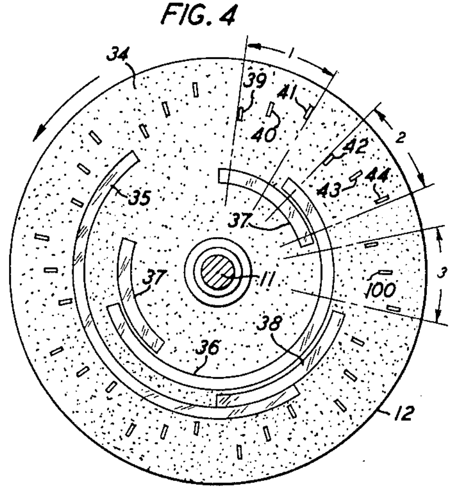
Fig. 4 shows an exemplary code disc.

A code disc 12 shown in Figs. 1, 4 and 5 is mounted upon the shaft 11 and rotated with the shaft. In addition, one or more discs carrying symbols are also mounted upon the shaft 11 and rotated with this shaft. The discs carrying symbols are all accurately positioned relative to the code disc so that each one of the symbols is in a viewing position at the time the corresponding code in the code disc passes in front of the photoelectric cells 13 shown in Figs. 1 and 5. As many discs as may be desired may be located upon the shaft 11 and rotated with it and employed to display the corresponding symbols under control of the received coded information. The symbols displayed by each of the display discs may be entirely independent of symbols displayed by any of the other display discs or the same symbols may be displayed by all or any group of the discs. In each case each display is under control of the control circuits as described hereinafter. Furthermore, additional display or symbol discs may be located on other shafts which rotate in synchronism with shaft 11 or they may be coupled to shaft 11 by means of synchronizing equipment which maintains these other shafts in synchronism with the rotating shaft 11. In addition, the code discs may be located at a point remote from shaft 11, if they are rotated by means of a flexible shaft or in other suitable manner synchronously with shaft 11.

Two such symbol bearing discs are shown in Fig. 1 while only one such code disc is shown in Fig. 5.

The code disc 12 is illuminated by light from lamp 14, which is focused by the optical system 15 and mirror 16 upon the code disc 12. The light source 14 is shown as a single filament lamp which is focused in a sharp line radially upon the code disc 12. The light from the lamp 14 then passes through the code disc to the photoelectric cells 13.

A flashing lamp 17 together with an optical system 18 and mirror 19 is employed to direct light from the lamp 17 through the symbol bearing disc 20 and then upon a mirror or other suitable surface 21 where the numerals are displayed. A second light source 22 is provided for a second symbol disc 23, Fig. 1. The light from lamp 22 is transmitted through an optical system 24, the mirror 25 to the symbol bearing disc 23. The light is then transmitted to a second mirror 26 where another display may be observed.

Code disc 12 as shown in Figs. 1 and 5 is shown in detail in Fig. 4. The code disc comprises a plurality of transparent and opaque portions. The code disc may be made from a sheet of metal perforated as shown in Fig. 4. However, in one exemplary embodiment of the invention code disc 12 comprises a sheet of transparent plastic material coated on one side with an opaque paint or metal foil or other opaque material and the opaque material has cut-out portions as shown in Fig. 4. The cut-out portions permit the light to pass through the disc while the opaque material prevents the light from passing through the disc. The cut-out portions or perforations in the opaque material are arranged in concentric circles on the disc and a photoelectric cell, as shown in supporting member 13 in Figs. 1 and 5, is positioned beneath the code disc under each of the concentric rings. The first four inner concentric rings of the opaque material are cut out or removed so that the light passes through the disc in the first four rings in the form of code combinations which represent the various positions of the code disc, which positions of the code disc correspond to different numerals of the symbol disc which are in the respective viewing fields or apertures. Thus the portions 37 in the inner ring permit light to pass through the code disc during the portion representing the numerals 1, 2, 7 and 8. The cut-out portion 36 of the second ring permits light to pass through the code disc in positions 2, 3, 4, 5, 6 and 7, cut-out portion 38 of the third ring permits light to pass through code disc in positions 4 and 5; and cut-out portion 35 of the fourth ring allows light to pass through the code disc in positions 5, 6, 7, 8 and 9. Thus each one of the positions of the code disc shown in Fig. 4 permits the light to pass through the first four concentric rings in ten different code combinations, each code combination representing a different numeral having corresponding positions on the symbol discs.

The outer three rings on the code disc have three indexing indicia, means, or apertures in the opaque material for each of the ten positions of the disc. Thus the section of the disc representing the numeral 1 is provided with indexing apertures 39, 40 and 41. These indexing or timing apertures permit light to pass through the code disc, which light is employed to initiate and control the flashing of the display lamps as will be described hereinafter. When the first denominational order of the number to be displayed has a 1 in the highest denominational order, the light passing through the indexing or timing aperture 41 will cause the display lamp to flash and thus illuminate the numeral 1 in the highest denominational order position. When the number has a 1 in the second denominational order position then light passing through the indexing or timing aperture 40 causes the display lamp to flash and illuminate the numeral 1 in its middle or second position, while when the number has a 1 in the third or lowest denominational order light passing through the indexing or timing aperture 39 causes the 1 to be illuminated at a slightly later instant of time thus causing the 1 to appear in the last or third denominational position of the number.

Figure 3:
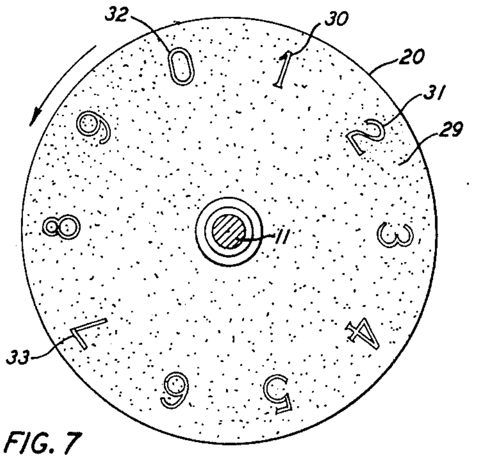
Fig. 3 shows in detail one of the discs carrying the symbols to be displayed.

In addition to the code disc 12, one or more numeral or symbol discs 20 are also provided. In the exemplary embodiment of this invention, one or more numeral discs such as shown in Fig. 3 and represented in Figs. 1 and 5 are provided. This disc has the numerals 1 through 0, inclusive, arranged around the periphery of the disc. The numeral or symbol disc 20 may be constructed similarly to the code disc 12. It may be a solid metal with the numerals cut out or it may be of transparent plastic with an opaque coating with the numerals cut out of the opaque coatings so that the disc passes light in the form of numerals or other symbols. The opaque material may be imbedded in the plastic when desired as is well understood. In addition, the code discs and the numeral discs need not be constructed of the same material and all of the numeral discs need not be constructed of the same material nor need they have the same symbols or numerals positioned around their periphery. Furthermore, these discs may have any desired number of numerals or symbols so long as each numeral or symbol is represented by a specific code on the code discs. Furthermore, more than three positions for illuminating each of the numerals may be provided.

Referring to Fig. 5 signals representing the numerals to be displayed are applied to the leads 89 incoming to the system. The incoming information may be obtained from communication circuits such as telegraph circuits and systems; telephone circuits and systems; registers in machine switching systems; registers in computer systems, etc. The incoming information may be obtained from manually operated registers or switching devices such as keys.

In the exemplary system described herein in detail the incoming information is supplied in three code groups of signals, one group representing the units digit or denominational order of the number, another group representing the tens digit or denominational order of the number and the third group representing the hundreds digit or denominational order of the number. The information supplied over each of these groups in the exemplary embodiment described herein is in the form of either one or the other of two signaling conditions applied to each of four leads. Such signaling conditions are sometimes called binary codes. These codes for each of the denominational orders of the number correspond to the code representations of the corresponding positions of the code wheel and symbol discs so that once during each revolution of the code disc and symbol discs the code output from photoelectric cells mounted in the support 13 correspond to the incoming code applied to the corresponding comparer circuits 50, 49 and 48. As represented in Fig. 1 a numeral 3 is being illuminated in the tens denominational order of the number. Consequently, the four input leads to the tens digit comparator 49 will be set to represent the numeral 3. As shown in code disc 12 the numeral 3 is represented by light passing through the aperture 36 which is the second aperture from the center of the code disc 12. When the ribbon of light from lamp source 14 falls in section 3 of the code disc the corresponding code is applied to the output leads from the corresponding phototransistor cells, with the result that the camparer circuit 49 will have corresponding signals supplied to it. As a consequence of this code combination being the same as that applied to the input of the comparer circuit 49 when the aperture 100 passes under the line of light radially illuminating the code disc a positive pulse of short duration is permitted to be transmitted through the tens denominational order timing circuit 46 and causes the tube 51 to conduct and produce a flash of light in lamp 17. Whenever the code combinations applied to the comparator circuit 49 are not the same, no pulses are allowed to pass through the timing circuit 46 to the flash lamp 17. The flash of light from lamp 17 passes through the numeral or symbol disc 20 and illuminates the display mirror or other surface 21 and causes the numeral 3 to appear. So long as the input information remains a 3 as described above the lamp 17 flashes each revolution at a corresponding time causing a 3 to be illuminated in the tens denominational order position of the numeral being displaced. When the input code is changed lamp 17 will flash at the time representing a new input information in the manner similar to that described above. Likewise, the lamp flashes when the symbol disc is in corresponding position to illuminate the other numerals or symbols to display the number represented by the input information supplied over the input leads of the hundreds digit comparer 48 and of the units digit comparer circuit 50.

Figure 2:
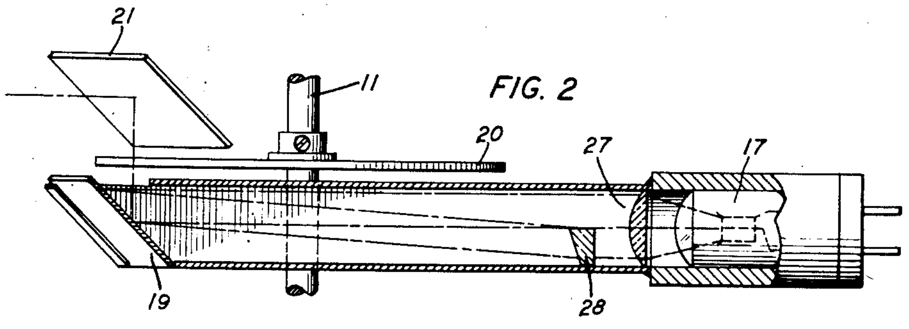
Fig. 2 shows details of the optical system employed to illuminate the symbols.

Fig. 2 shows the optical arrangement for illuminating the various symbols or numerals on the numeral disc 20. This illuminating arrangement comprises the lamp 17 which may comprise an R-1131C lamp made by the Sylvania Lamp Corporation. This lamp 17 produces light when the voltage applied to it exceeds a predetermined voltage. The light emanates from the top or end of the bulb and passes through a collimating or condenser lens 27. A prism 28 is then placed across approximately one half of the beam of light and is arranged to refract or bend the light passing through this prism so that it falls on top of the other half of the beam of light as this light passes through the symbol disc 20 after being reflected from the mirror 19. By thus superimposing the light of one-half of the beam upon the light of the other half of the beam the intensity of the light obtained from the lamp 17 is doubled and the illuminated area more nearly conforms to the positions of the symbols. This light is reflected from mirror 19 through the various symbols on numeral disc 20 to the viewing surface 21 where the numbers appear. When desired, a translucent screen may be interposed ahead of disc 20 in which case the numbers will appear to originate on the translucent screen.

Figure 6:
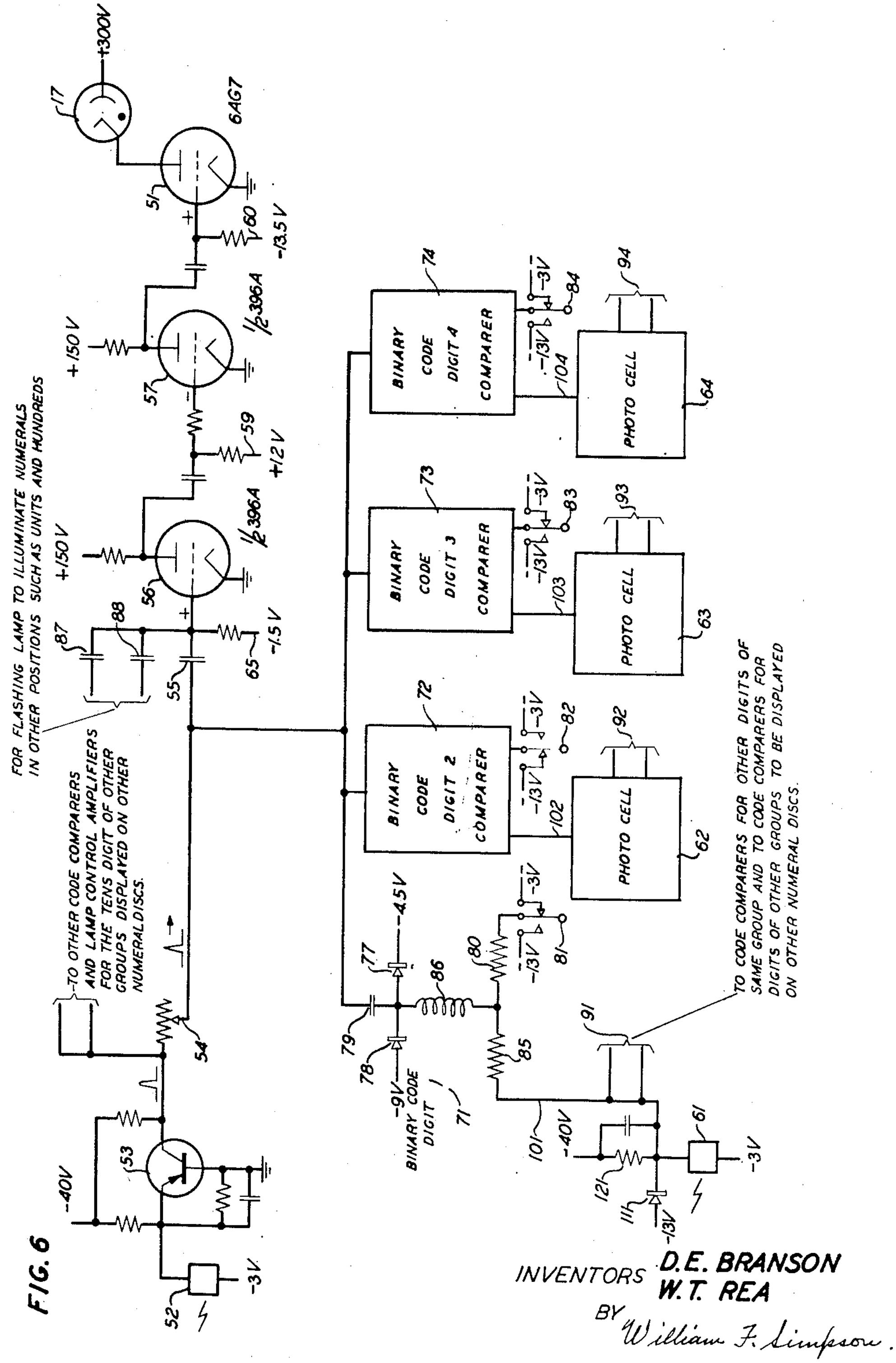
Fig. 6 shows in detail the control circuits for selecting and illuminating one of the symbols, each revolution of the discs.

Fig. 6 shows the circuit details of an exemplary arrangement for flashing the illuminating lamp 17 as described above. For purposes of illustration it is assumed that lamp 17 is to be flashed to illuminate the 3 in the center or tens denominational order as shown in Figs. 1 and 5. The control circuits for flashing lamp 17 at this time are shown in detail in Fig. 6, and Fig. 7 shows graphs of the voltages or currents in the system. If it is desired to illuminate another 3 at this time as, for example, the 3 in disc 23 of Fig. 1 then similar circuits will be similarly actuated to flash the lamp 22 at the same time lamp 17 is flashed. Both lamps 17 and 22 will be flashed at other times during each revolution to illuminate the numeral in the first and last order of the number in a manner similar to that described with respect to the middle denominational order. The flashing of lamp 17 to illuminate the center or tens denominational order is controlled by the middle one of the right-hand group of three photoelectric cells supported in structure 13. This photoelectric cell which is assumed to be a phototransistor, is represented by the phototransistor 52 of Fig. 6. The other phototransistors of the right-hand group of three mounted in structure 13 are employed to control the flashing of lamp 17 to illuminate the other numerals in the first and third denominational positions of the number. The four left-hand phototransistors mounted in structure 13 are employed in combination with the code apertures in the code plate and are represented in Fig. 6 by the phototransistors 61, 62, 63 and 64.

The phototransistors 52, 61, 62, 63 and 64, as well as the other phototransistors employed in the exemplary embodiment of this invention described herein, have a high impedance when they are in the dark or not illuminated and have a relatively low impedance when light falls upon the light-sensitive portion of the transistor.

Thus with respect to the phototransistors 61, 62, 63 and 64, when these phototransistors are not illuminated the output leads 101, 102, 103 and 104 will be maintained at a voltage of approximately −13 volts by means of diodes, such as diode 111, connecting to a −13 volt source. In other words the diode 111 is connected so that current flows through it from the negative 13 volts connected to its left-hand terminal to the −40 volts connected to the upper terminal of resistor 121. The forward impedance of the diode 111 is sufficiently low in comparison with resistor 121 so that its right-hand terminal and thus the conductors 101 are at substantially −13 volts. However, when light falls upon phototransistor 61 the impedance of the device falls to a relatively low value and the voltage drop across resistor 121 increases with the result that the voltage of the output leads 101, rises to approximately −3 volts. In a similar manner light falling upon phototransistors 62, 63, and 64 causes the voltage of output leads 102, 103, and 104 to rise to −3 volts.

The output leads 101, 102, 103 and 104 are connected to the binary code digit comparing units 71, 72, 73 and 74. Each of these units is supplied by a binary digit from the input information source. This input information is supplied, in an exemplary embodiment of this invention, in the form of voltages applied to input conductors. In the exemplary embodiment of this invention described herein these voltages are obtained from a register represented by switches 81, 82, 83 and 84 in Fig. 6. These switches may be manually controlled by keys or other manual means or they may be automatically controlled by relays, by electronic circuits or by record controlled switches or record controlled electronic circuits and devices which will apply either −13 volts or −3 volts to them. The switches 81, 82, 83 and 84 or other devices may be controlled manually as stated above or they may be controlled by apparatus responsive to telegraph signals. Alternatively these switches, mechanical or electronic devices may be controlled by registers in communication switching systems; by registers in calculating and computing devices and systems; by call and annunciator systems; by reservation and traffic control systems; by stock quotation systems; etc. For the purpose of illustration it is assumed herein, as shown in Fig. 6, that it is desirable to illuminate numeral 3. Consequently the switches 81, 82, 83 and 84 are shown in the positions to represent the digit 3 in the same code as the numeral 3 is represented on the code disc 12; namely, by a mark, light or current condition in the second binary position, and the opposite condition in all of the other binary positions, namely as spacing, no light, or no current condition. It should be noted that the potential conditions supplied by the switches 81, 82, 83 and 84 are opposite to the potential conditions supplied by the output leads 101, 102, 103 and 104. Thus when no light falls on the phototransistor 61, −13 volts is applied to the output lead 101, and when the switch 81 is set in a corresponding position −3 volts is applied by this switch to the resistor 80. As assumed above the phototransistor 62 is illuminated by light at the time shown in Figs. 1 and 5 so that the output lead 102 will have substantially −3 volts applied to it. The switch device 82 however has −13 volts applied to it. The photoelectric cells of phototransistors 63 and 64 are not illuminated at this time so that the output leads 103 and 104 will have substantially −13 volts applied to them while the switching devices 83 and 84 will apply substantially −3 volts to the binary comparing units 73 and 74, which are all substantially the same. The binary comparing unit 71 is shown in detail and comprises two resistors 85 and 80. Resistor 85 is connected to the output of lead 101 and resistor 80 is connected to the switching device 81. The junction between these two resistors is connected through an inductance coil 86 to the common point between the diodes 77 and 78. The diodes 77 and 78 are connected in series between a source of −4½ volts and a source of −9 volts in such a way that both these diodes have a relatively high impedance to these voltage sources, assuming for the moment that no voltage is applied either by the switch 81 or the output of lead 101. Furthermore, so long as the voltage of the mid-point between the diodes 77 and 78 remains between the voltages of −9 and −4½ volts, the impedance of both of the diodes 77 and 78 remains high because the voltages applied to these devices are in their reverse direction. However, in case the voltage applied to the mid-point between the diodes 77 and 78 become less than −9 volts; that is, becomes substantially −13 volts, then the diode 78 starts to conduct and has a relatively low impedance and tends to maintain the midpoint between diodes 77 and 78 at a voltage of −9 volts. Alternatively when the voltage of the midpoint between diodes 77 and 78 rises to above −4½ volts the impedance of diode 77 falls to a relatively low value and tends to maintain the voltage of the mid-point at substantially −4½ volts. Thus, so long as the voltage applied to the mid-point between these diodes remains between −9 volts and −4½ volts the impedance of both diodes is high, but when it is attempted to apply a higher or lower voltage to this point the impedance of one or the other of the diodes falls to a relatively low value, and tends to maintain the voltage at this time at either −9 volts or −4½ volts.

Thus, if the output lead 101 and the output of the switching device 81 are both at −13 volts, the diode 78 will be conducting and have a relatively low impedance. Likewise, if the output lead 101 and the output of switch 81 are both −3 volts, diode 77 will be conducting at a relatively low impedance. However, if the output voltage on lead 101 is −13 volts and the output of the switch 81 is −3 volts, then the voltage applied to the mid-point of the diodes 77 and 78 through the inductance 86 will be between these two voltages and substantially equal to −8 volts, assuming resistors 80 and 85 to be substantially equal. Consequently, both of the diodes 77 and 78 will have a high impedance. Thus, with switch 81 positioned as shown in the drawing during the time light falls on the phototransistor 61 the voltage of the common point between the diodes 77 and 78 is at substantially 4½ volts minus as pointed out above. During the time no light falls on the phototransistor 61 the voltage at the junction point between the diodes 77 and 78 is at substantially −8 volts. In accordance with the first code element (or apertures 37 of the code disc 12 as shown in Fig. 4), potential at this point is at substantially −4½ volts during the time the numerals 1 and 2 are in position to be illuminated because light falls upon the phototransistor 61 at this time. The same is true during the time the numerals 7 and 8 are in position to be illuminated. During the time no light falls upon the phototransistor 61 the potential of the mid-point between diodes 77 and 78 is at −8 volts which is during the time the numerals 3, 4, 5, 6, 9 and 0 are in position to be illuminated. Likewise, with switch 82 in the position shown in Fig. 6 the impedance of one or the other of the diodes corresponding to diodes 77 and 78 in the binary code comparing unit 72 is low during the time the numerals 1, 8, 9 and 0 are in the illuminating position.

With the switches 81, 82 and 83 in the positions shown in Fig. 6 the potentials of the mid-points between the corresponding diodes of the first three binary comparer units 71, 72 and 73 are shown in Fig. 7 by curves 131, 132 and 133, respectively. The curves 131, 132 and 133 show the potential of the mid-points of the respective units during the time the positions 1, 2, 3 and 4 of the code disc are illuminated by the radial line of light from lamp 14. Thus, during positions 1 and 2 the first photoelectric or phototransistor 61 is illuminated by light with the result that the potential of conductor 101 approaches −3 volts. Consequently, with the switch 81 in the position shown, the mid-point between resistors 80 and 85 and thus between the diodes 77 and 78 tends to approach −3 volts. Diode 77 however, maintains the voltage of the mid-point at approximately −4½ volts. In positions 3 and 4 the transistor 61 is not illuminated so that the potential applied to conductor 101 tends to fall to −13 volts. Consequently, the mid-point between resistors 80 and 85 tends to approach −8 volts. As a result, the voltage of the mid-point between the diodes 77 and 78 therefore assumes approximately −8 volts since this voltage is between the voltages of −4½ volts and the −9 volts applied to the other terminals of the diodes 77 and 78. The same condition prevails during the time the code disc is in the No. 4 position. In other positions as described hereinbefore the voltage of the mid-point between the diodes 77 and 78 is determined by the apertures 37 of the code disc and the position of key or switch 81.

The photoelectric cell circuit 62 is not illuminated in position 1 so that the output of the phototransistor will tend to apply approximately −13 volts to conductor 102 and with switch 82 also connected to −13 volts, the voltage of the mid-point of the corresponding diodes 77 and 78 also tends to approach −13 volts as shown by curve 132. It is prevented from doing so however by the −9 volts connected to one of the diodes which maintains the voltage at this point −9 volts. As shown by aperture 36 of the code disc 12, the photoelectric cell, circuit 62 is illuminated in positions 2, 3 and 4 with the result that approximately −3 volts is applied to conductor 102 with the result that the mid-point of the two diodes will be approximately at −8 volts since switch 82 is set to apply −13 volts to the comparer unit 72. The same condition prevails for positions 3 and 4 of the code disc.

Curve 133 relates to the photoelectric cell and the comparer 73. In the first three positions the photoelectric cell 63 is not illuminated as shown by the aperture 38 in the code disc 12 with the result that the output photoelectric cell 63 as applied to lead 103 is at approximately −13 volts. This voltage together with the −3 volts from the switch 83 positioned as shown in the drawing applies −8 volts to the junction between the diodes of the comparer 73 which correspond to the diodes 77 and 78. In position 4 the photoelectric cell is illuminated with the result that the potential applied to conductor 103 rises to approximately −3 volts. This voltage together with the −3 volts from switch 83 tend to cause the voltage of the mid-points of the diodes of this comparer to rise to −3 volts. The potential at this point, however, is prevented from so rising due to the energy supplied from the −4½ volts to the corresponding diode which energy tends to maintain the voltage of the mid-points of this comparer at approximately −4½ volts.

The voltage condition of the mid-point of the final binary digit comparer 74 is determined by the light passing through the aperture 35 in the various positions of the code disc 12. The voltage condition between the diodes of each of the binary digit comparer units 71, 72, 73 and 74 are likewise similarly determined for the other positions 5 through 0 of the code disc.

With the proper positioning of the keys 81, 82, 83 and 84 in the manner described above, the mid-points between the diodes 77 and 78 and the corresponding diodes in units 72, 73 and 74 are simultaneously at −8 volts in all of the binary code digit comparer units for only one position of the code disc. Under the assumed conditions this will be position 3. Thus, under the assumed conditions in position 3 the mid-point between diodes 77 and 78 is at −8 volts as shown by curve 131 and not in positions 1 and 2. Curve 132 similarly shows that the corresponding voltage of unit 72 is at −8 volts in position 3 but not in position 1, while as curve 133 shows the corresponding voltage in unit 73 is at −8 volts at positions 1, 2 and 3 of the code disc but not in position 4. The mid-point in the binary digit comparer 74 is at −8 volts in all of the positions 1, 2, 3 and 4. With other settings of the keys 81, 82, 83 and 84 the mid-points between these diodes will be at −8 volts in some other one position of the code disc as determined by the settings of these keys. It is to be noted in Fig. 7 that lines 66 represent a −3 volt potential, lines 67 represent −4½ volts, lines 68 represent −8 volts, lines 69 represent −9 volts, and lines 70 represent −13 volts.

As pointed out above, it is only when the voltage of the mid-points of the diodes 77 and 78 are between −4 volts and −9 volts, i. e., −8 volts, for example, that the impedance of the respective diodes is high. For other voltages the impedance of one or the other of the diodes is low. As a result, the impedance of one or more of the diodes 77 and 78, and the corresponding diodes in binary code digit units 72, 73 and 74 is low in all of the positions of the code discs, except position 3.

The phototransistor 52 receives a flash of light each time the apertures 40, 43 and 100 and the corresponding apertures in the other positions at the same radius of the code disc pass over the line of light from lamp 17. As a result, a positive pulse from phototransistor 52 is applied to the emitter of the transistor 53 in response to each of these flashes of light. These positive outgoing pulses are amplified by the transistor 53 and applied over conductor 54 and through condenser 79 to the junction between the diodes 77 and 78. Conductor 54 is likewise connected through a corresponding condenser to the midpoint of the corresponding diodes in the binary units 72, 73 and 74. The coupling condenser 79 and the corresponding condensers in the other units are sufficiently large so that they readily transmit positive pulses applied to line 54 by the transistor 53. The impedance of the diodes 77 and 78 when they are conducting is sufficiently low so that they effectively suppress or reduce the magnitude of this positive pulse to a relatively low value so that it is ineffective to control the remaining circuits. So long as any one of the diodes 77 and 78 and the corresponding diodes of binary units 72, 73 and 74 is conducting, the output from the transistor 53 is sufficiently reduced in amplitude so that it is incapable of further affecting the operation of the system. These pulses are represented at 75 in curves 131, 132 and 133. However, when none of the diodes of any of the binary units 71, 72, 73 and 74 is conducting they all present a sufficiently high impedance so that a positive pulse of approximately 3 volts in magnitude is applied to the control grid of tube 56 through coupling condenser 55. Under the assumed conditions and with the switches 81, 82, 83 and 84 in the positions shown in the drawing, this condition prevails only during the time the numeral 3 is in position to be illuminated by a flash of lamp 17. Due to the position of the indexing or timing aperture 100 the flash of light occurs when the numeral 3 is at the center of the space allotted to the numerals, so that the 3 will appear in the middle or tens position or denominational order of the number to be displayed. This positive pulse is repeated and amplified by the tube 56. As a result a negative output pulse is repeated in the anode circuit of this tube. Tube 57 is normally conducting due to the positive bias source 59 connected to its grid. Consequently, when the amplified negative pulse or voltage is applied to the grid of tube 57, the conduction through this tube is substantially interrupted and as a result a relatively high positive pulse is applied to the grid of the output tube 51. Consequently, a pulse of appreciable magnitude is repeated in the output circuit of tube 51 which pulse is supplied to the flashing tube 17 and produces a flash in this tube.

The other control circuits for controlling the illumination of the numerals in the other denominational orders are substantially the same as the circuit shown in Fig. 6. They are connected to the photoelectric units such as 61 by conductors 91, 92, 93 and 94. The code disc circuits, the phototransistor light cell and the transistor amplifier similar to amplifier 53 for other digits are respectively connected through the coupling condensers 87 and 88 to the grid or control element of tube 56. Thus, each of the circuits produces a flash of light when the numeral for which it is set passes a viewing position.

By positioning the keys or switches 81, 82, 83 and 84 and the corresponding keys or switches for the other denominational orders, any of the numerals on the numeral disc 20 may be illuminated in any one of the three positions as shown in the drawing.

Inductance 86 is connected between the mid-points of resistors 80 and 85 and the mid-points of the diodes 77 and 78 to provide a high impedance between the diodes 77 and 78 and the resistances 80 and 85. The inductance 86 together with the resistors 80 and 85 present a sufficiently high impedance so that the setting of other keys for selecting numerals for the other denominational orders will not interfere with the operation of the photoelectric cell 61, 62, 63 or 64. Likewise, the setting of any of these other keys will not interfere with the operation of the circuit and apparatus described above.

It is to be understood that the above-described arrangements are illustrative of the application of the principles of this invention and that numerous other arrangements may be devised by those skilled in the art without departing from the spirit and scope of this invention.

What is claimed is:

1. A numerical display device comprising a numerical disc bearing numerals, a code disc bearing code indicia representing said numerals, means for continuously rotating both of said discs in fixed angular relationship, photoelectric means for generating code groups of electrical signals under control of said code disc representing the instantaneous position of said discs, means for storing signal codes representing numerals to be displayed, circuits for comparing the codes generated by said code disc with the codes stored in said storage means, a lamp for illuminating said numerical disc, control means for said lamp connected to said comparing circuits for flashing said lamp under control of said code disc and said comparing circuits when a desired numeral on said numerical disc is in a viewing position.

2. In a display device, a plurality of symbols to be displayed, a display field, a symbol wheel for continuously and successively moving said symbols through said display field, a code wheel having coded groups of indicia each group of which represents one of said plurality of symbols, means for continuously moving said symbols and said code wheel with a fixed relative position one with the other, apparatus for deriving electrical code groups of signals from said code disc representing said symbols at the time said symbols are moved through said display field, a lamp for illuminating said symbols as they are moved through said display field, a flashing circuit for flashing said lamp under control of said code groups of signals representing said symbol for flashing said lamp during the time said symbols are in said display field, additional indicia on said code disc representing different positions of said symbols in said display field, apparatus for deriving an additional electrical signal under control of said additional indicia, and means interconnected with said control device and said source of additional signals for further controlling the time of flashing of said lamp.

3. A display device for displaying any of a plurality of symbols in a plurality of different contiguous display fields, comprising a rotatable member carrying each of the symbols to be displayed through each of the said different contiguous display fields, a second rotatable member carrying code indicia representing each of said plurality of symbols, means for rotating both of said members with a fixed relative angular position one with the other, a lamp for illuminating said symbols, means for deriving electrical signals from said code member representing said symbols during the time said symbols are moved through said different contiguous display fields, and means controlled by said signals for flashing said lamp.

4. A display device for displaying any of a plurality of different symbols in a plurality of different contiguous display fields, comprising a movable member carrying each of the symbols to be displayed through each of said different contiguous display fields, a movable member carrying code indicia representing each of said plurality of symbols, means for moving both of said members with a fixed relative position one with the other, a lamp for illuminating said symbols, means for deriving different electrical signals from said code member representing each of said different symbols during the time each of said different symbols are moved through each of said different contiguous display fields, and means for selecting predetermined ones of said different signals and apparatus for flashing said lamp under control of said selected signals.

5. A display device for displaying any of a plurality of symbols in any of a plurality of display fields comprising a symbol carrying member, a code carrying member carrying code indicia representing the symbols on said symbol carrying member, means for continuously moving said members with a fixed relationship one with another, means for deriving code groups of electrical signals from said code carrying member, a lamp for illuminating said symbol carrying member, additional indicia on said code wheel representing different ones of said display fields and control means jointly responsive to said additional indicia and said signals for flashing said lamp.

6. A display device for displaying any of a plurality of symbols in any of a plurality of display fields comprising a symbol bearing member, a code bearing member carrying code indicia representing the symbols on said symbol bearing member, means for continuously moving said members in a fixed relationship one with another, means for deriving code groups of electrical signals from said code bearing member, a lamp for illuminating said symbol bearing member, and means for selecting predetermined ones of said signals, additional indicia on said code wheel representing different ones of said display fields, apparatus jointly controlled by said signals and said additional indicia for flashing said lamp to illuminate selected symbols in predetermined ones of said display fields.

7. A display device comprising symbol carrying means, code carrying means carrying coded indicia representing the symbols on said symbol carrying means, index carrying means carrying a plurality of index indicia for each of the symbols on said symbol carrying means, means for continuously moving said means in a fixed relationship one with another, means for deriving code groups of electrical signals from said code carrying means, a lamp for illuminating said symbol carrying member, and means jointly controlled by said electrical signals and said index indicia for flashing said lamp to illuminate said symbols.

8. A display device comprising symbol carrying means, code carrying means carrying coded indicia representing the symbols on said symbol carrying means, an index carrying means carrying a plurality of index indicia for each of the symbols on said symbol carrying means, means for continuously moving said means in a fixed relationship one with another, means for deriving code groups of electrical signals from said code carrying means, a lamp for illuminating said symbol carrying means, input means for receiving input codes representing said symbols, comparing means for comparing said input codes with said electrical signals derived from said code carrying means, and means jointly controlled by said comparing means and said indexing indicia for flashing said lamp.

9. A display device comprising symbol carrying means, code carrying means carrying coded indicia representing symbols on said symbol carrying means, an index carrying means carrying a plurality of indices for each of said symbols, means for continuously moving said means in a fixed relationship one with another, a flashing lamp for illuminating said symbol carrying means, means jointly controlled by said coded indicia and said index indicia for flashing said lamp to illuminate selected ones of said symbols in selected positions of said symbol carrying means.

10. A display device comprising in combination, a symbol carrying member, a lamp for illuminating symbols on said member, an index carrying member having a predetermined number *n* of indicia individual to and differently positioned relative to each of said symbols on said symbol carrying member, means for cyclically moving said members in a fixed relationship one with another, means for selectively flashing said lamp under control of said index indicia for illuminating said symbol carrying member *n* times during each cyclic movement thereof for displaying the symbols on said symbol carrying member in *n* different positions during each cyclic movement of said symbol bearing member.

11. A binary code comparing device comprising a first source of binary code signals, a second source of binary code signals, a diode for each element of each of said codes, a common connection between the diodes of corresponding elements of said codes, a transmission circuit, means for interconnecting said common connections with said transmission circuit, bias means for each of said common points for maintaining the impedance of at least one of said diodes low to shunt said transmission path when the corresponding code elements of said codes are different.

12. A code comparing device comprising a first source of code signals each code of which comprises the same number of code elements and each code element of which comprises one of a plurality of different discrete characteristics, a second source of code signals the codes of which are similar to the codes of said first source of code signals, a comparing circuit individual to corresponding elements of said codes, each of said comparing circuits comprising a pluarlity of diodes having a common connection, a transmission circuit extending to all of said common connections, bias means individual to each of said comparing circuits responsive to the corresponding code elements of said first and second sources of code signals for maintaining the impedance of at least one of said diodes low when the characteristics of said corresponding code elements are different.

References Cited in the file of this patent

UNITED STATES PATENTS

| | | |
|---|---|---|
| 1,933,650 | Bascom | Nov. 7, 1933 |
| 2,533,242 | Gridley | Dec. 12, 1950 |
| 2,633,297 | Quinby | Mar. 31, 1953 |
| 2,666,911 | Reynolds | Jan. 19, 1954 |
| 2,674,727 | Spielberg | Apr. 6, 1954 |
| 2,675,539 | McGuigan | Apr. 13, 1954 |
| 2,713,456 | Reynolds | July 19, 1955 |